US008052354B2

(12) United States Patent
Schneider

(10) Patent No.: US 8,052,354 B2
(45) Date of Patent: Nov. 8, 2011

(54) METHOD AND DEVICE TO PREVENT CONTAMINATION OF A TRANSPORT DEVICE BY FRESHLY GLUED FIBERS

(75) Inventor: Fritz Schneider, Krefeld (DE)

(73) Assignee: Dieffenbacher GmbH Maschinen-und Anlagenbau, Eppingen (DE)

( * ) Notice: Subject to any disclaimer, the term of this patent is extended or adjusted under 35 U.S.C. 154(b) by 337 days.

(21) Appl. No.: 11/718,930

(22) PCT Filed: Nov. 2, 2005

(86) PCT No.: PCT/EP2005/011672

§ 371 (c)(1),
(2), (4) Date: May 9, 2007

(87) PCT Pub. No.: WO2006/050840

PCT Pub. Date: May 18, 2006

(65) Prior Publication Data

US 2007/0295438 A1 Dec. 27, 2007

(30) Foreign Application Priority Data

Nov. 10, 2004 (DE) ......................... 10 2004 054 162

(51) Int. Cl.
*B65G 53/00* (2006.01)

(52) U.S. Cl. ......................................................... 406/49

(58) Field of Classification Search .............. 406/46-49, 406/181, 122, 144, 194, 197
See application file for complete search history.

(56) References Cited

U.S. PATENT DOCUMENTS

| | | | | | |
|---|---|---|---|---|---|
| 1,336,402 | A | * | 4/1920 | Weiss | 264/115 |
| 2,579,770 | A | * | 12/1951 | Uschmann | 264/115 |
| 2,743,758 | A | * | 5/1956 | Uschmann | 264/162 |
| 2,919,742 | A | * | 1/1960 | Schubert et al. | 264/118 |
| 3,371,137 | A | * | 2/1968 | Asplund | 264/121 |
| 3,630,456 | A | * | 12/1971 | Mark | 241/18 |
| 3,632,371 | A | * | 1/1972 | Mikulka | 427/180 |
| 3,801,434 | A | * | 4/1974 | Carlsson | 162/201 |
| 4,009,912 | A | * | 3/1977 | Mraz | 406/144 |
| 4,323,314 | A | | 4/1982 | Kaiser-Wirz | |
| 4,871,284 | A | * | 10/1989 | Duffy | 406/49 |
| 5,034,175 | A | * | 7/1991 | Safstrom | 264/120 |
| 5,193,942 | A | * | 3/1993 | Berry et al. | 406/47 |
| 5,403,128 | A | * | 4/1995 | Thomas | 406/39 |

(Continued)

FOREIGN PATENT DOCUMENTS

DE 1653264 A1 1/1972

(Continued)

*Primary Examiner* — Gene Crawford
*Assistant Examiner* — William R Harp
(74) *Attorney, Agent, or Firm* — Fox Rothschild LLP

(57) ABSTRACT

The invention relates to a method and a device (1) to prevent contamination on a wall inner side (53, 54, 55, 56, 67) of a transport device (10) for fibers (60) which are designated for the production of fiberboards and which after wetting with glue in a dry-gluing unit (2) are transported by the transport device to a further processing unit (13) by means of transport air. By returning dried material (50), which has been acquired during the course of further processing of the glued fibers and no longer has any cold-sticky glue, into the flow (7) of fibers (60), which still comprise cold-sticky glue, in the transport device, the said contamination is prevented in an effective and inexpensive manner.

10 Claims, 2 Drawing Sheets

U.S. PATENT DOCUMENTS

Figure 1:
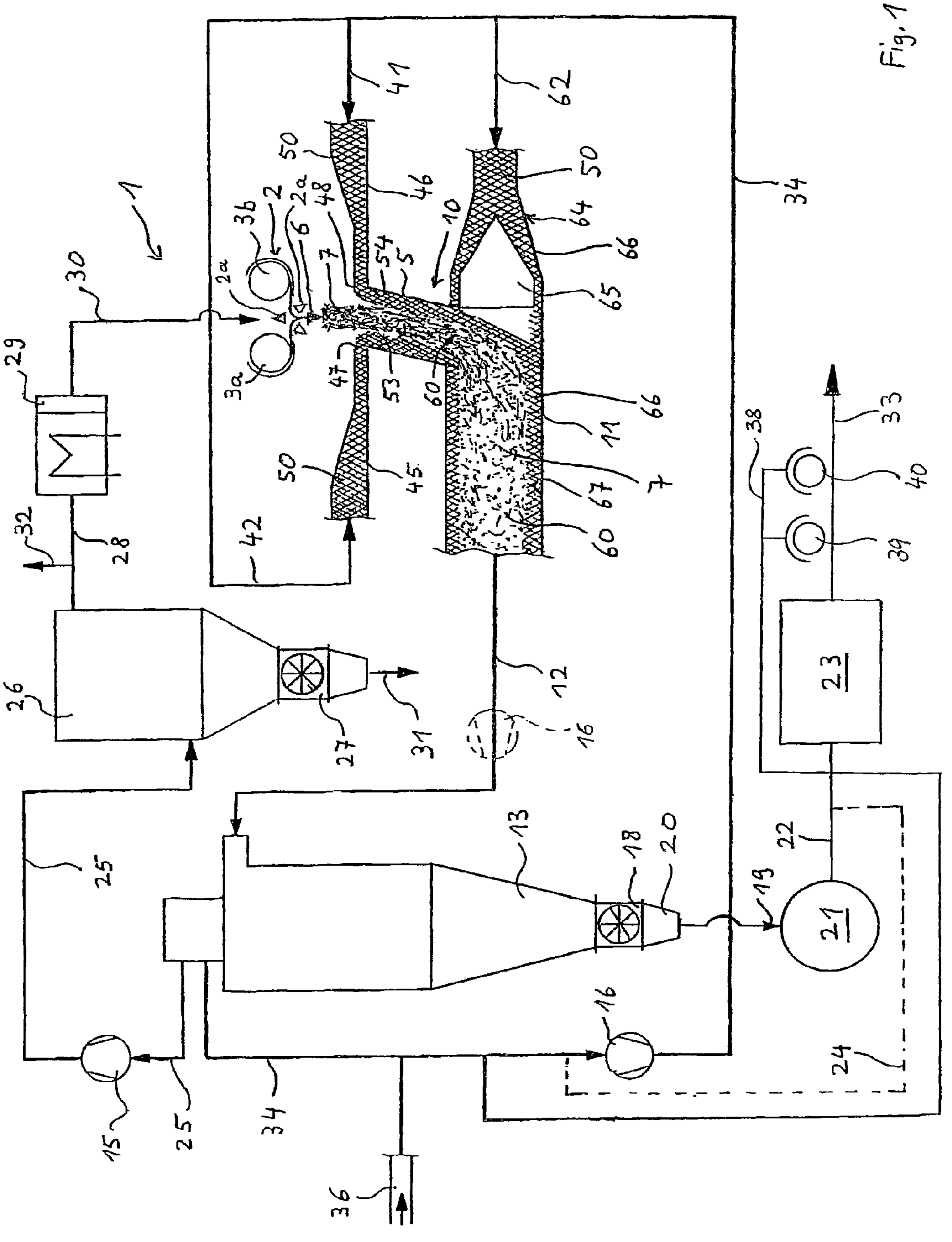

| | | | | |
|---|---|---|---|---|
| 5,461,874 | A * | 10/1995 | Thompson | 62/60 |
| 5,520,777 | A * | 5/1996 | Shisko | 162/13 |
| 6,221,521 | B1 * | 4/2001 | Lynn et al. | 428/703 |
| 7,390,447 | B1 * | 6/2008 | Clark et al. | 264/120 |

FOREIGN PATENT DOCUMENTS

| | | | |
|---|---|---|---|
| DE | 10247412 | A1 | 4/2004 |
| DE | 10247413 | A1 | 4/2004 |
| DE | 10247414 | | 4/2004 |
| EP | 1398127 | A | 3/2004 |
| WO | WO02/14038 | | 2/2002 |

* cited by examiner

METHOD AND DEVICE TO PREVENT CONTAMINATION OF A TRANSPORT DEVICE BY FRESHLY GLUED FIBERS

The invention relates to a method to prevent contamination on a wall inner side of a transport device for fibers designated for the production of fiberboards. The invention also relates to a corresponding device having a dry-gluing unit for wetting fibers designated for the production of fiberboards with glue and having a transport device for transporting the glued fibers by means of transport air to a further processing unit 8. The fibers are produced preferably from lignocellulose-containing and/or cellulose-containing materials. In particular, the fiberboards are light, medium-density or high-density fiberboards.

It is conventional to glue fibers, which are designated for the production of MDF- or HDF-boards, in the wet state. Alternatively, the fibers can also be glued in the dry state. Dry-gluing is described e.g. in WO 02/14038 A1. A problem with so-called dry-gluing is that by reason of a cold-stickiness of the glue, which occurs immediately after gluing, the freshly glued wood fibers tend to adhere to walls of a transport device which adjoins the dry-gluing unit and serves to transport the fibers pneumatically to a further processing unit.

The cold-stickiness or cold adhesive force of the glue, which is also defined as "tack" occurs for only a few seconds after wetting of the fibers with glue. The cold-stickiness is reduced very quickly because the transport air in the pneumatic transport device ensures that the surface of the glue is dried rapidly. In practice, contamination on a wall inner side of the transport device is a serious problem. In particular, during separation from the wall, the contamination can cause so-called glue spots on the finished fiberboard.

In practice, in order to overcome the problem described, various measures are applied also in combination. In this case, this involves heating the transport air, in order to dry the surface of the glue in the most rapid possible manner, or admixing liquid separating agents which reduce the cold-stickiness of the glue. Furthermore, the wall inner side of the transport device is also cooled in practice by means of a cooling means which is located in a cover of the transport line. As a consequence, a continuous film of condensation water is produced on the wall inner side which prevents adhesion of freshly glued fibers. Furthermore, it is known from the documents DE 102 47 412 A1, DE 102 47 413 A1 and DE 102 47 414 A1 to provide in a discharge chute of a gluing device a peripheral air flow which surrounds the freshly glued fibers. The peripheral air which can be fresh air which is preheated with high energy consumption in a heat exchanger serves to prevent any deposit build-ups on the walls of the discharge chute. Since the peripheral air does not contain any fiber material, air turbulences can easily cause the glued fibers or glue mist (see below) to come into contact with the walls of the discharge chute.

Disadvantages of all of these measures are that they are expensive, consume a large amount of energy and are ultimately unsatisfactory.

Furthermore, it is known from DE 102 47 412 A1, DE 102 47 413 A1 and DE 102 47 414 A1 respectively to redirect some of the fibers separated in a cyclone to the fiber-gluing. However, this measure serves exclusively to achieve more effective gluing. Moreover, it is described in these documents to apply unglued fibers on to a band screen which is designated for the formation of a fiber mat, before glued fibers are scattered on to the band screen. As a consequence, a preliminary mat as it were is formed on the band screen, so that the glued fibers do not pass directly on to the band screen. This obviates or reduces contamination of the band screen by still cold-sticky fibers or even glue.

DE 16 53 264 A1 discloses a method and a device for gluing wood chips, wherein chips which have not yet been glued or have been glued inadequately, are returned to the gluing procedure. It is also described to direct chips to a further gluing device after passage through a first gluing device. However, measures to prevent contamination of a transport device adjoining a gluing device are not disclosed.

It is the object of the invention to provide an effective and inexpensive generic method to prevent contamination on a wall inner side of a transport device. It is also the object of the invention to provide an associated device.

The object relating to the method is achieved by providing a method, described herein, for preventing contamination on a wall inner side of a transport device for fibers which are designated for the production of fiberboards. After gluing which is carried out in the dry state and takes place as a rule in an unenclosed environment, the fibers are directed to a transport device. In this transport device the fibers are transported in a pneumatic manner. In so doing, dried material is returned to the flow of fibers which still comprise cold-sticky glue (also referred to hereinunder as freshly glued fibers) in or into the transport device. The dried material is glued material which has been acquired during the course of further processing of the glued fibers and no longer comprises any cold-sticky glue. Preferably, the dried material is added as early as possible after gluing to the flow of freshly glued fibers. In particular, it is preferred to add the dried material to the flow of freshly glued fibers when they enter the transport device. Provision can also be made to add dried material to the flow of freshly glued fibers in a controlled manner at any points in the pneumatic transport device which are particularly critical in relation to contamination.

In particular, the dried material can be returned in such a manner that it mixes with fibers comprising the still cold-sticky glue and thus passes directly into the flow of these fibers. The dried material rubs against the wall inner side of the transport device and in this way ensures that the wall remains clean. Furthermore, the dried material absorbs glue mist in the transport air. This glue mist is fine glue droplets which are produced by atomization of the glue in the dry-gluing unit and do not pass on to fibers to be glued but rather remain in the air flow and can cause contamination and deposit build-ups on the inner walls of the transport device. These free-floating residual droplets of glue make up about 1% of the glue atomized in the dry-gluing unit. If dried material is returned to the flow of freshly glued fibers, the contact between these freshly glued fibers and the transport device is reduced accordingly.

Since the dried material has been acquired during the course of further processing of the glued fibers and thus originally traces back to these fibers, it still has a heat which is retained by returning the material to the entire fiber processing process. Furthermore, the material which is returned is also kept warm by the warm transport air.

The dried material is preferably returned in such a manner that it is guided in the transport device between the flow of freshly glued fibers and the at least one wall inner side of the transport device. This prevents freshly glued fibers from coming into contact directly with the wall inner side of the transport device.

It is particularly advantageous if the dried material is returned to the flow of freshly glued fibers in such a manner that the freshly glued fibers are surrounded partially or completely by the dried material. In this case, in a tubular transport line it can be provided that the freshly glued fibers move in a central region of the pipe and this central region is surrounded completely by dried material, thus preventing any direct contact between the freshly glued fibers and the wall inner side of the pipe. Accordingly, in the case of a pipe line which is rectangular in cross-section provision can be made to guide the dried material along the four wall inner sides of the pipe and thereby to surround the flow of freshly glued fibers. The same applies to all other cross-sections which a section of a transport device can comprise, in particular all cross-sections which are possible between round and rectangular. In particular, the dried material can be guided along a part of the wall inner sides or all wall inner sides of the section such that the flow of freshly glued fibers is at least partially surrounded by the dried material.

In particular, the further processing unit can be a sifter or a forming machine. A fiber mat is formed in the forming machine after usually the glued fibers have been sifted. The sifted fibers then pass from a metering bin in a metered manner on to a forming belt in dependence upon the speed thereof. As a rule, an upper layer of the scattered mat is removed by a scalping roller. Furthermore, the mat typically also passes through a side trimming unit, in which fibers are removed from the edges of the mat. Then, the mat is directed to a press for pressing the raw board. Depending upon the thickness and width of the fiberboard which is to be produced, the portion of fibers which is separated from the scattered mat by the scalping roller or the side trimming unit can be up to 40% of the fiber material quantity which is discharged from the metering bin on to the forming belt. In the case of conventional fiberboard installations which use wet- or dry-gluing, the fibers separated by the scalping roller or the side trimming unit are returned to the processing process as recycled material. The procedure of returning the fibers to the process can be performed in various ways. Most frequently, the separated fibers are guided in a pneumatic manner directly into a metering device of a fiber sifter or to the fiber transport between a fiber sifter and a forming machine or directly into a metering bin of a forming machine. All three variations essentially require a fan, an air-fiber separator and a cellular wheel sluice.

In accordance with the invention, the fiber material which has been removed from the formed fiber mat by means of the scalping roller or the side trimming unit can be used in part or completely as the dried material which is returned to the flow of freshly glued fibers. In so doing, neither a further air-fiber separator nor a further cellular wheel sluice are required.

As a rule, installations for the production of fiberboards comprise a scalping roller and a side trimming unit. In particular, should no scalping roller and no side trimming unit be provided however, provision can also be made to use, as dried material, fibers which have been discharged directly from the flow of glued fibers for return to the flow of freshly glued fibers. However, this return procedure can also take place in addition to the return of fiber material which accumulates at the scalping roller or the side trimming unit, e.g. if this material is not sufficient. Preferably, this branching of the fibers takes place at a point in the processing process where the fibers no longer have any cold-stickiness. The branching point can be located e.g. between a sifter and a metering bin located upstream of the forming machine.

Raw MDF- and HDF-boards are ground on both sides to a desired thickness predominantly on wide belt grinding machines. The stock removal generally amounts to 0.2 to 0.4 mm per side. This produces considerable quantities of sanding dust. This sanding dust is typically fed into combustors. In practice, it is also known in the case of wet-gluing to direct a portion of the sanding dust to the pipe dryer. However, the possible return quantity of the sanding dust is limited and is generally between 2 to 4% in relation to absolutely dry fibers. In accordance with the invention, sanding dust can be returned as described above separately or together with fiber material to the flow of freshly glued fibers in the transport device instead of into the fiber dryer. However, since the glue of the sanding dust is already hardened and the sanding dust is thus practically unglued material, the return quantity is restricted. Therefore, sanding dust is preferably returned in combination with fiber material to the flow of freshly glued fibers. The sanding dust can also be dust from flakeboards.

With regard to the device, the aforementioned object is achieved by providing a device having a dry-gluing unit for wetting fibers designated for the production of fiberboards with glue, and having a transport device for transporting the glued fibers by means of transport air to a further processing unit, characterized in that the device comprises means in order to return dried material, which has been acquired during the course of further processing of the glued fibers and no longer has any cold-sticky glue, to the flow of fibers, which still comprise cold-sticky glue, in the transport device. The method can be carried out with the device. Essentially the same advantages are achieved as those which have been described in conjunction with the method.

Figure 3:
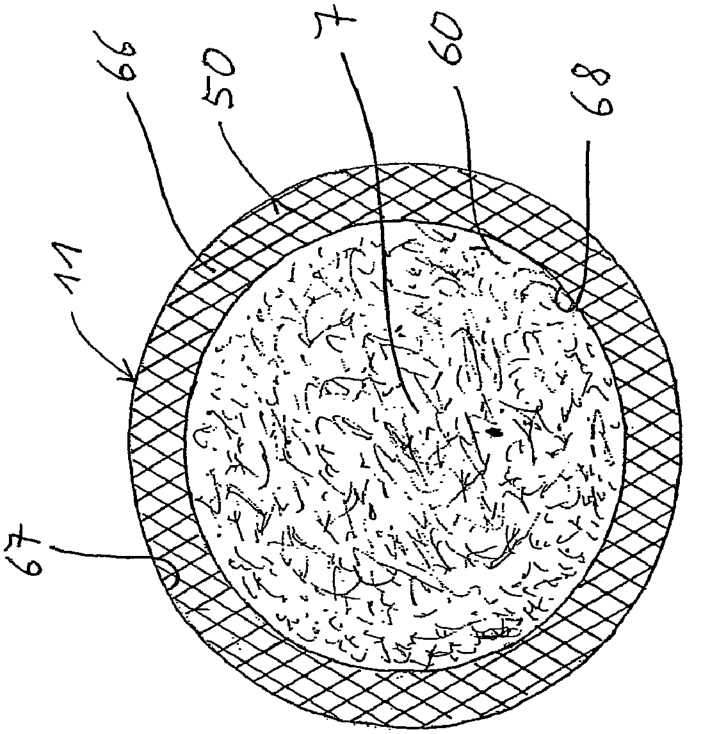
Figure 2:
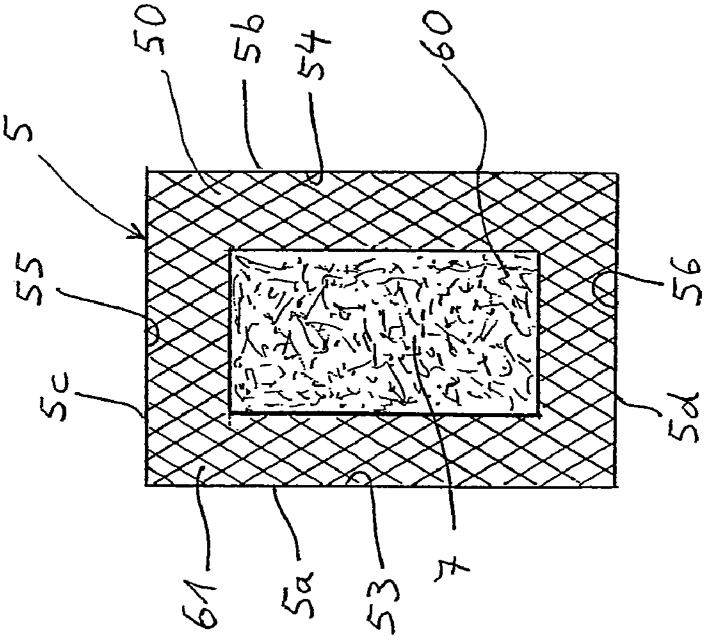

The invention will be described in detail hereinunder with reference to an exemplified embodiment, wherein reference is made to the Figures, in which FIG. 1 shows schematically a device in accordance with the invention, FIG. 2 shows schematically a cross-section of a suction chute of FIG. 1, FIG. 3 shows schematically a cross-section of a suction pipe of FIG. 1.

The device in accordance with the invention as shown in FIG. 1 is designated by the reference numeral 1 and comprises a dry-gluing unit 2. The dry-gluing unit 2 includes two fiber rollers 3*a* and 3*b* which convey dried fibers, wherein the fibers are glued e.g. by means of spray nozzles 2*a* in an unenclosed zone. Two flows of glued fibers 60 come together as indicated by the arrow 6. The flow of the freshly glued fibers 60 is designated by the reference numeral 7. The flow 7 passes into a suction chute 5 which forms part of a transport device 10 and is located below the unenclosed zone. The suction chute 5 is connected to a suction pipe 11. The suction pipe 11 becomes a pneumatic transport line 12 which directs the flow 7 of freshly glued fibers 60 to a fiber-air separator 13. In so doing, the fibers are transported by transport air which is generated by two fans 15 and 16. The freshly glued fibers are separated from the transport air in the fiber-air separator 13. The fibers are discharged from the fiber-air separator 13 via a cellular wheel sluice 18 and are transferred to the further processing process, as indicated by the arrow 19.

In particular, the discharged fibers can be directed, via a transverse fibre distributing device 20 connected to the cellular wheel sluice 18, to a further processing unit 21 with a metering device and a sifter. Connected to this as a further processing unit 23 is a combination of a further metering bin and a forming machine, wherein both processing units 21, 23 are connected via a further pneumatic transport device 22 to an air-fiber separator, a cellular wheel sluice and a transverse fiber distributing device, not illustrated in each case. The arrow 33 indicates the further processing of a fiber mat coming from the forming machine.

Some of the air from the fiber-air separator 13 is directed to a dust filter 26 via the fan 15 and a pneumatic transport line 25. An air outlet of the dust filter 26 is connected to a pneumatic transport line 28 which leads to an air heater 29. Some of the purified air is heated in the air heater 29 and returned to the dry-gluing unit 2 via a pneumatic transport line 30. The rest of the purified air ventilates to the atmosphere via an air outlet which is indicated by the arrow 32. Air moisture which is generated by the partial evaporation of the moisture of the fibers is carried off with this ventilation air. The dust filter 26 comprises a cellular wheel sluice 27, via which the dust is discharged, as indicated by the arrow 31.

The air which is drawn in via the fan 16 is returned unfiltered and unheated as return air via a transport line 34 to the suction chute 5 or to the suction pipe 11 as intake air.

Since the air flow passing from the air-fiber separator 13 into the transport line 34 no longer contains any fibers, the air flow which is drawn in by the fan 16 can be supplied with dried material. This takes place on the one hand via a supply line 36 for sanding dust and on the other hand via a suction connection 38 for fibers which have been removed from a formed fiber mat, not illustrated, by means of a scalping roller 39 or a side trimming unit 40. These fibers are previously glued fibers, i.e. fibers which no longer comprise any cold-sticky glue. If neither a scalping roller 39 nor a side trimming unit 40 were provided, previously glued fibers could also be directed to the pneumatic transport line 34 and thus to the flow 7 of freshly glued fibers 60 via a further pneumatic transport line 24, which is indicated by a broken line, between the processing units 21 and 23.

The dried material consisting of previously glued fibers and sanding dust is directed to flat jet nozzles 45 and 46 via the pneumatic transport line 34 and the further pneumatic transport lines 41 and 42. The suction chute 5 comprises a rectangular cross-section, as illustrated in FIG. 2 below the flat jet nozzles 45, 46. The flat jet nozzle 45 issues aligned horizontally on a broadside 5*a* into the chute 5 and the flat jet nozzle 46 does so accordingly on the opposite-lying broadside 5*b*. The flat jet nozzles 45 and 46 each comprise an outlet orifice 47 and 48 respectively which extends along the entire width 5*a* and 5*b* respectively of the suction chute 5. Dried material 50 is illustrated in the Figures by cross hatching. Dried material 50 which issues out of the outlet orifices 47 and 48 is guided by the negative pressure in the suction chute 5 downwards along wall inner sides 53 and 54 of the suction chute 5. The suction chute 5 is dimensioned in cross-section such that its width and length are considerably larger than the cross-section of the flow 7 of freshly glued fibers 60. In this manner, dried material 50 from the flat jet nozzles 45 and 46 can also be located on the shorter transverse sides 5*c* and 5*d* of the cross-section of the suction chute 5. All four wall inner sides 53, 54, 55 and 56 are thus covered by a protective cover 61 consisting of dried material 50, whereas the flow 7 of freshly glued fibers 60 is located in a central region of the cross-section of the suction chute 5 and is surrounded by the protective cover 61.

Dried material 50 is directed to an annular jet nozzle 64 via a further transport line 62. A conical nozzle insert 65 and a conical outer cover 66 of the annular jet nozzle 64 cooperate in such a manner that the dried material 50 enters in an annular manner into the suction pipe 11. At the location where the suction chute 5 issues into the suction pipe 11, the flow 7 of freshly glued fibers 60 is received into the centre of the suction pipe 11 and passes through an upper region of the annular flow of dried material 50 which is ejected from the annular jet nozzle 64.

As illustrated in particular in FIG. 3, the flow 7 of freshly glued fibers 60 moves in an inner region of the suction pipe 11. The flow 7 of freshly glued fibers 60 is surrounded by an annular protective cover 66 consisting of dried material 50, so that the freshly glued fibers 60 do not come into contact with a wall inner side 67 of the suction pipe 11. An inner edge 68 of the annular protective cover 66 comprises a diameter which is dimensioned to be considerably larger than the outer dimensions of the flow 7 of freshly glued fibers 60. As a consequence, the protective cover 66 around the freshly glued fibers 60 is retained for a sufficient period of time in order to obviate any deposit build-ups on the wall inner side 67 over a critical section of the suction pipe 11. This is the case although in essence both materials can be mixed by reason of a typically spiral-like air flow in a pneumatic transport line. The air speed in the suction pipe 11 can be adjusted in a variable manner. Both the freshly glued fibers 60 and the dried material 50 are directed via the transport line 12 to the fiber-air separator 13 by means of the transport air, in order to be processed further for the production of a fiberboard.

The above exemplified embodiment relates to a pneumatic transport system which, as far as the fiber-air separator 13 is concerned, operates in a negative state. In this case, the fan 16 is located at the air outlet side of the fiber-air separator 13 and the fibers are not transported through the fan 16. However, the method in accordance with the invention also includes the case, in which the pneumatic transport system operates in a positive state. Then, the fan 16 is located at the air inlet side of the air-fiber separator 13, as shown in FIG. 1 by the fan 16 illustrated by the broken line.

The invention claimed is:

1. A method to reduce contamination on a wall inner side of a pneumatic transport device for fibers designated for the production of fiberboards, the method comprising the steps of:

wetting with glue a first plurality of fibers in a dry-gluing unit for subsequent transport in the pneumatic transport device by means of transport air, acquiring dried material from the first plurality of fibers after said wetting with glue, such that the dried material no longer includes any cold-sticky glue obtained from said wetting with glue;

returning the dried material to a flow of a second plurality of fibers in the pneumatic transport device after the second plurality of fibers have been wetted with glue wherein the flow of the second plurality of fibers still includes cold-sticky glue.

2. Method as claimed in claim 1, wherein the dried material is returned in such a manner that it is guided in the transport device between the flow of fibers which still comprise cold-sticky glue, and the wall inner side.

3. The method of claim 2 wherein the dried material is absorbent dried material for absorbing glue.

4. Method as claimed in claim 1, wherein the flow of fibers, which still comprise cold-sticky glue, is surrounded at least partially by the dried material.

5. Method as claimed in claim 4, wherein the dried material is fiber material which has been removed from a formed fiber mat by a scalping roller.

6. Method as claimed in claim 1, wherein the dried material is fiber material which has been removed from a formed fiber mat by a scalping roller.

7. Method as claimed in claim 1, wherein the dried material is fiber material which has been removed from a formed fiber mat by means of a side trimming unit.

8. Method as claimed in claim 1, wherein the dried material is fibers which have been discharged from a flow of glued fibers.

9. Method as claimed in claim 1, wherein the dried material is sanding dust which has been produced during sanding of a raw fiberboard produced by pressing a fiber mat.

10. Method as claimed in claim 1, wherein the dried material is fiber material which has been removed from a formed fiber mat by a scalping roller.

* * * * *